US005732982A

United States Patent [19]
Gebelius

[11] Patent Number: 5,732,982
[45] Date of Patent: Mar. 31, 1998

[54] COUPLING JOINT

[76] Inventor: Sven Runo Vilhelm Gebelius, P.O. Box 81, Nynäshamn, Sweden, S-149 21

[21] Appl. No.: 553,500
[22] PCT Filed: Jun. 4, 1993
[86] PCT No.: PCT/SE93/00484
  § 371 Date: Nov. 30, 1995
  § 102(e) Date: Nov. 30, 1995
[87] PCT Pub. No.: WO94/29628
  PCT Pub. Date: Dec. 22, 1994
[51] Int. Cl.$^6$ ............................................. F16L 55/00
[52] U.S. Cl. .................... 285/49; 285/285; 285/910; 285/328; 285/370
[58] Field of Search ................... 285/382.2, 403, 285/49, 382.1, 382, 370, 328, 903, 910

[56] References Cited

U.S. PATENT DOCUMENTS

| | | | |
|---|---|---|---|
| 58,469 | 10/1866 | Parker | 285/910 X |
| 180,911 | 8/1876 | O'Neill | 285/910 X |
| 2,052,603 | 9/1936 | Christenson | 285/910 X |
| 2,085,907 | 7/1937 | Gray . | |
| 2,259,609 | 10/1941 | Boyd | 285/910 X |
| 3,038,553 | 6/1962 | Peters | 285/49 X |
| 3,376,060 | 4/1968 | Tomioka | 285/382 X |
| 3,926,445 | 12/1975 | Farnam | 285/910 X |
| 4,516,782 | 5/1985 | Usher | 285/910 X |

FOREIGN PATENT DOCUMENTS

| | | |
|---|---|---|
| 0174120 | 3/1986 | European Pat. Off. . |
| 738480 | 12/1932 | France . |

Primary Examiner—Terry Lee Melius
Assistant Examiner—Heather Shackelford
Attorney, Agent, or Firm—Jacobson, Price, Holman & Stern, PLLC

[57] ABSTRACT

A coupling joint, arranged to join a first element having a substantially circular internal envelope surface with a second element, inserted into the first element and having a smaller external diameter than the internal diameter of the first element. The coupling joint includes a helically wound, and in longitudinal direction, corrugated or creased strip-shaped intermediate member, which is located in an intermediate position between the first and the second element. An expanding or clamping joint, applied against the first or second element causes same to be pressed against the intermediate member causing same to be compressed or pressed against adjacent envelope surfaces of the elements. The side edge portions of the intermediate member are preferably arranged extending towards one and same element, and engage with the element when the intermediate member is compressed or pressed. At least one of the end portions of the strip-shaped intermediate member is preferably arranged having an extension not similar to a line coinciding with the winding centre for the intermediate member.

9 Claims, 3 Drawing Sheets

5,732,982

1

COUPLING JOINT

FIELD OF THE INVENTION

The present invention relates to a coupling joint, arranged to join a first element having a substantially circular internal envelope surface to a second element, inserted into the first element, having a substantially circular envelope surface with a smaller diameter than the internal diameter of the first element.

BACKGROUND OF THE INVENTION

It is previously known, for example with regard to ventilation installations, to join tubular elements having different diameters by use of an intermediate member, with a first end portion having a diameter adapted to one of the tubular parts to be joined, and having the opposed end portion arranged with a diameter adapted to the second tubular element. Such intermediate members are manufactured for only one specific type of use, and cannot be modified for use with other tubular dimensions. For many other applications, adaption is also required between an element with a cylindrical external envelope surface and a second element with a cylindrical internal envelope surface, and with a large diameter difference between internal and external diameters. For certain cases, a tubular sleeve can be used to accomplish a required diameter adaption between the elements. However, such sleeves are also manufactured for a predetermined diameter adaption, and cannot be modified for adaption within a different range of diameters. The elements between which diameter adaption is required may be tubular, solid or semi-solid.

SUMMARY OF THE INVENTION

The object of the present invention is to disclose a coupling joint, which easily can be adjusted to an actual diameter difference within a certain predetermined range, and which facilitates providing a joint which is resistant against vibrational and bending forces, and which also can be arranged having very good sealing properties. The joint is in particular suitable as a coupling joint between two tubular elements or hoses, but can also be used for applications when one of the elements has a substantially solid cross-section.

The joint can be mounted quickly and simply, without use of special purpose tools.

The coupling joint according to the present invention is arranged to join a first element having a substantially circular internal envelope surface with a second element, inserted into the first element, having a smaller external diameter than the internal diameter of the first element, and it is mainly characterized in that a helically wound and in a longitudinal direction, corrugated or creased strip-shaped intermediate member is arranged in an intermediate position between the first and the second element, and that at least one of the elements by means of an expanding or clamping joint is pressed against the intermediate member causing same to be compressed or pressed against adjacent envelope surfaces of the elements.

BRIEF DESCRIPTION OF THE DRAWINGS

Examples of embodiments of a coupling joint according to the present invention will now be more fully described with reference to the accompanying drawings, in which.

2

Figure 1:
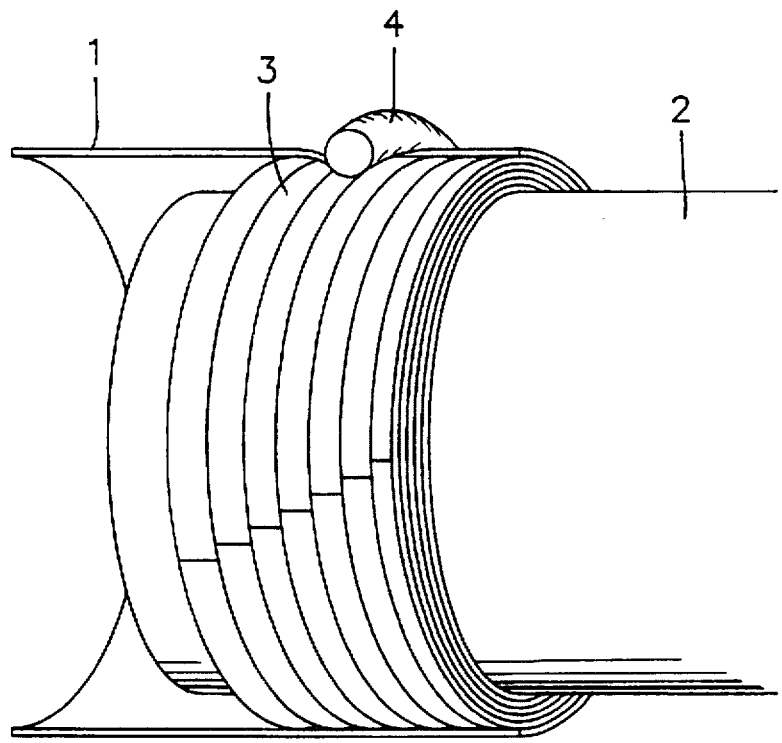
FIG. 1 shows a perspective view, partly in cross-section, disclosing two tubular elements joined by means of a coupling joint according to the present invention.
Figure 2:
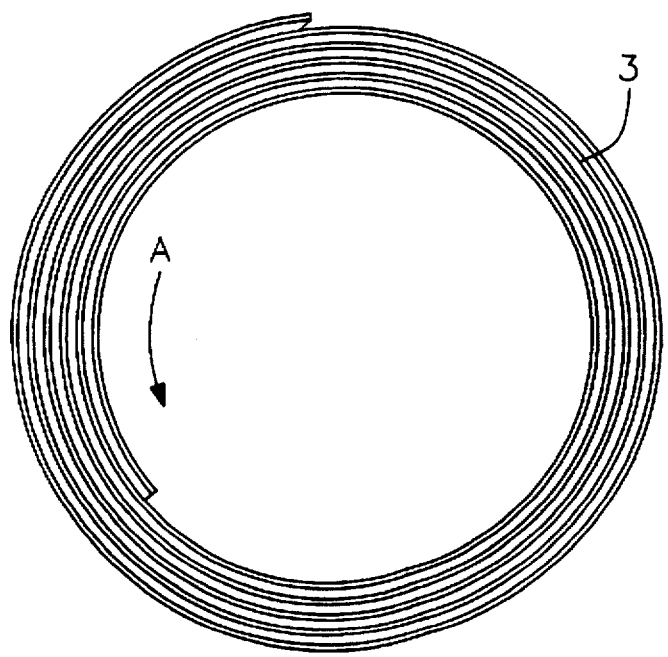
Figure 3:
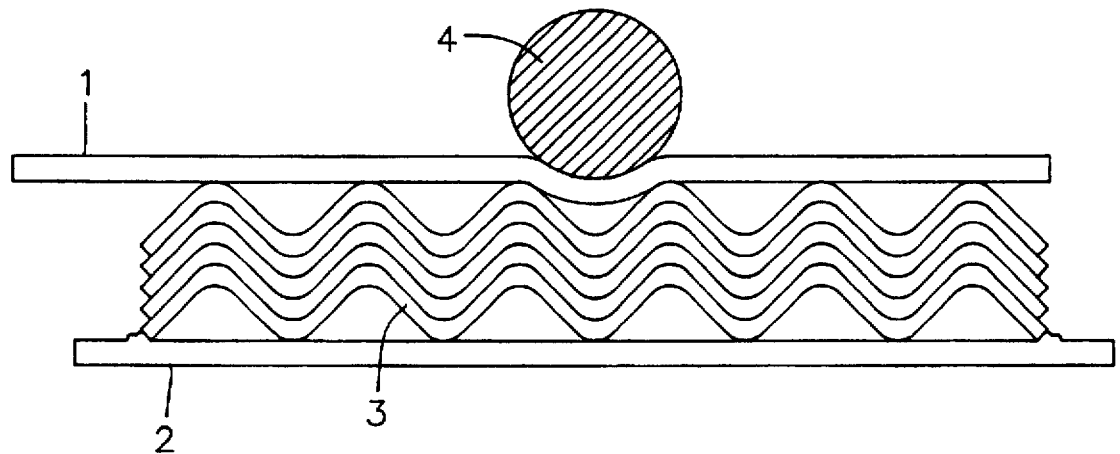
Figure 4:
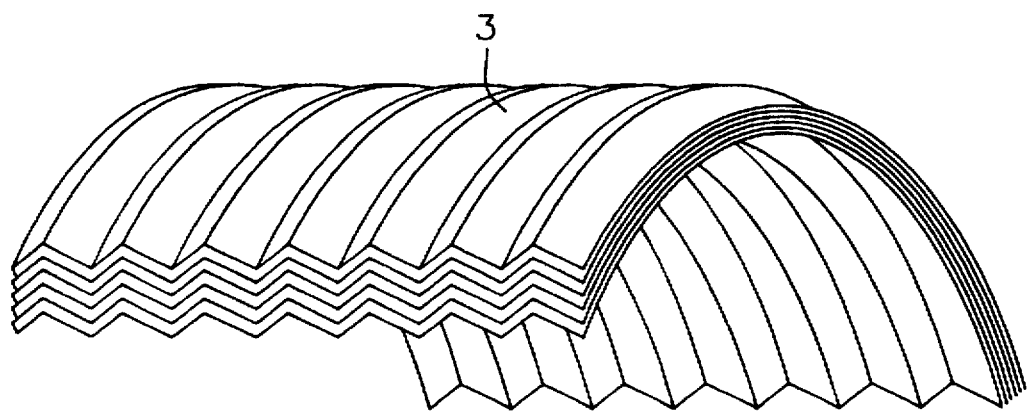

FIG. 2 shows a cross-sectional view of the member located intermediately between the elements in the example of an embodiment shown in FIG. 1;

FIG. 3 is a longitudinal sectional view of a wall portion of the two elements shown in FIG. 1; and FIG. 4 is a perspective view of part of the intermediately located member shown in FIG. 3.

Figure 5:
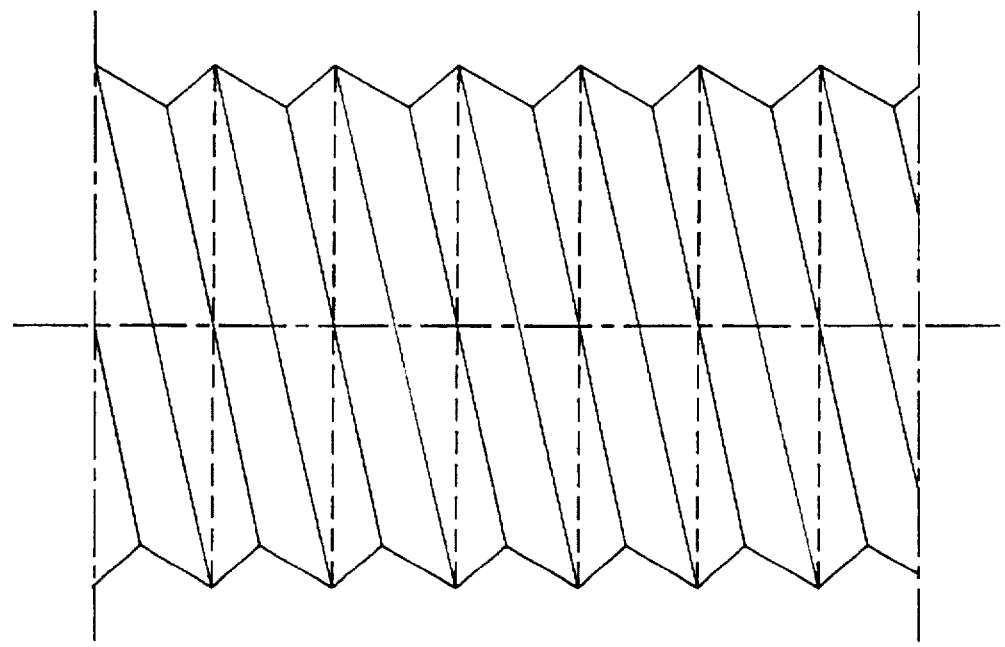

FIG. 5 is a side view of a helically wound intermediate member having corrugations or creases extending in an inclined relationship to its longitudinal axis.

Figure 6:
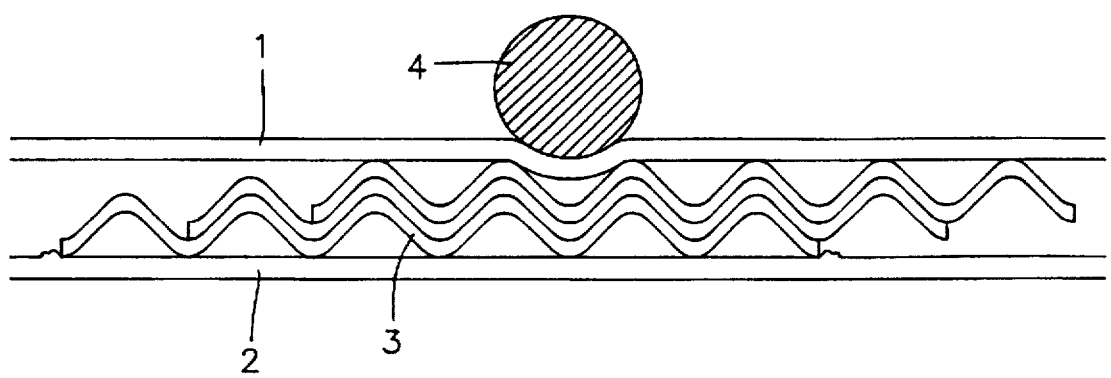

FIG. 6 is a longitudinal sectional view of the intermediate member helically wound between the two elements similar to FIG. 3.

DETAILED DESCRIPTION OF THE PREFERRED EMBODIMENTS

FIG. 1 shows an example of an embodiment of a coupling joint according to the invention, arranged to join a first and external tubular element 1 with a second tubular element 2, inserted into the first element 1. The second element 2 has an external diameter which is considerably smaller than the internal diameter of the first element 1, said difference in diameter preventing establishment of a joint by use of a clamping joint, e.g. established by means of a conventional tube clamp.

According to the invention, this difference in diameter is overcome by means of an intermediate member, as a complete unit denominated 3, comprising a corrugated or creased strip-shaped member having wound layers as seen in FIG. 6, almost comparable with a helically wound blade spring, which is also shown in FIGS. 2 and 5. The intermediate member 3 is applied against the second element 2, and by applying a turning force against the outer portion of the intermediate member 3, directed against the winding direction, the adjacent turns are separated from each other, whereby application of same can be easily accomplished. Adjustment of the number of wound turns can alternatively be carried out either before or after mounting against said second element 2, in order to adjust the external diameter of the intermediate member 3 when mounted to the internal diameter of the first element 1. When inserting the second element 2 with the intermediate member 3 into the first element 1, the second element 2 is preferably rotated in the direction indicated by the arrow A in FIG. 2 whereby wound turns of the intermediate member 3 take up a more adjacent position to each other facilitating insertion into the first element 1. When such a rotary influence is terminated, the outer turn of the intermediate member 3 will be pressed against the internal envelope surface of the first element 1. A conventional tube clamp 4, as indicated in FIGS. 1 and 3, is used to additionally press the first element 1 against the intermediate member 3. As shown in FIG. 3, such a compression will cause the wall of the first external element 1 to be plastically deformed into engagement with the outer wound turn. Simultaneously the intermediate member 3 can obviously also can be compressed, and thus expand to an increased width. This will result in the outer free edge portions of the innermost wound turn somewhat engaging with the external wall of the second element 2, and that said engagement results in a pile-up of material in front of said edge portions, as illustrated in FIG. 3. The intermediate member 3 is thus locked in an extremely good manner against the embraced second element 2, and the aforementioned plastic deformation of the first element 1 also results in that said element 1 is locked in an efficient manner in relation to the intermediate member 3. Furthermore, the corrugated shape of the intermediate member 3 results in that both vibrational influence as well as bending influence will be taken up by the joint in an extremely good manner.

The sealing properties obtained by the above described joint are sufficient for many applications, but in those cases where further security against leakage may be required, the joint according to the present invention can be further modified. As a first action, a layer of a sealing compound can be applied against the internal and external surfaces of the intermediate member 3, and for further improved sealing, such a compound may also be applied between adjacently located wound turns. The expression "sealing compound" also includes materials having sealing properties in another form than a compound, e.g. in the form of a tape.

As shown in FIG. 1, the terminating part of the strip forming the intermediate member 3 can also be arranged as a part cut in an inclined direction to the centre axis, and in a similar fashion the first part of said strip can obviously be arranged with an end portion cut in an inclined direction. This end portion offset results in improved sealing properties as contraster with straight first and final end portions coinciding with the winding centre axis. Since all shapes, apart from a substantially transversely cut end portion in relation to the longitudinal direction of the strip, result in improved sealing properties, the first and final edge portions of the strip can obviously be given other shapes, e.g. V-shaped, where the edge portions extend in a common direction towards one of the elements, as shown in FIGS. 3 and 4.

The intermediate member 3 is as shown formed from a strip with substantially V-shaped portions and in relation to each other parallel corrugations or creases. Said corrugations can obviously be arranged having other cross-sectional configuration, e.g. U-shaped, and may also for certain applications include corrugations or creases extending substantially parallel but inclined in relation to the longitudinal direction of the strip, particularly for those cases when sealing properties are of minor interest.

As previously mentioned, the second and inside element 2 may also comprise a solid element. Furthermore, the first and external element 1 may also comprise a non-deformable element, provided that one or a number of diametrically expandable means can be arranged inside the second element 2, and pressing the second element 2 against the intermediate member 3. For such applications, the external edge portions of the intermediate member 3 are preferably arranged directed towards the first element 1, i.e. in an opposed directed relationship in relation to what is shown in FIG. 3.

In order to simplify the adjustment of the intermediate member 3 to a desired diameter, same can be arranged having markings, which indicate suitable points to make a cut in order to accomplish diameter changes of for example 0.5 or 1 mm. Such markings can also be arranged as fractural impressions, i.e. embossments or similar deformations that reduce the thickness of the strip, in order to a facilitate a further simplified adjustment to desired diameter.

The described design facilitates that the established joint in an extremely good fashion can take up existing vibrations, breaking forces and similar, forces since the intermediate member 3 almost can be regarded as a longitudinally extending spring unit, well adapted to take up various forces, which is clearly shown in FIG. 3. For those cases where the joint is intended to join elements of metal, the intermediate member is also preferably manufactured from metal, even though plastics and similar materials also can be used for certain applications. The coupling joint according to the present invention can further, obviously, be used to join elements of plastics, rubber, artificial rubber and other materials, in which cases the intermediate member 3 is manufactured from a material suitable for such fields of application.

Even though not directly mentioned, it is obviously possible for certain applications to exclude the clamping means, such as a tube clamp 4, and it is further obviously possible to use more than one such clamping means 4, when desired.

The intermediate member 3 is preferably arranged adapted to facilitate attachment to an embraced second element 2 having a diameter within a predetermined range, e.g. 25-28 mm, and with the possibility for adjustment within a larger diameter range with regard to the external first element 1, e.g. 40-80 mm. Particularly when fractural impressions or markings facilitate simple adjustment of the internal diameter, same can also be adjusted in a simple fashion within a larger diameter range. Adjustment of the internal diameter is facilitated by "pulling" the internal part of the strip in a side-directed relationship, and by cutting. Said part returns thereafter to its original position due to the resilient or elastic properties of the strip.

The favourable properties for taking up vibrations and bending forces in the coupling joint according to the present invention, and also the good sealing properties, which also can be maintained at an increased temperature, make it also possible to use the coupling joint for exhaust systems to combustion engines, and in such cases accomplish adaption between exhaust pipes and silencers having different tubular dimensions from each other, as well as adaption between other components with different dimensions from each other included in an exhaust system.

With reference to the example of an embodiment shown in the drawings, as well as the modifications described above, same are only intended to serve as examples of embodiments, since obviously further modifications can be made within the scope of the inventive thought and the following claims.

I claim:

1. Coupling joint comprising:
   a first element having a substantially circular internal envelope surface;
   a second element having an envelope surface, said second element being inserted into the first element, having a smaller external diameter than the internal diameter of the first element, and
   a helically wound, corrugated or creased strip-shaped intermediate member being arranged in an intermediate position between the first and the second elements, and at least one of the elements, by an expanding or clamping joint, being pressed against the intermediate member causing the intermediate member to be compressed or pressed against adjacent envelope surfaces of the elements.

2. Coupling joint according to claim 1, wherein edge portions of the intermediate member extend towards one of the elements.

3. Coupling joint according to claim 1, wherein at least one end portion of the strip-shaped intermediate member is cut at an inclined direction with respect to a center axis of the joint.

4. Coupling joint according to claim 1, wherein the corrugations or creases of the intermediate member include a number of parallel corrugations or creases, extending in a longitudinal direction of the strip-shaped member.

5. Coupling joint according to claim 1, wherein the corrugations or creases of the intermediate member include a number of parallel corrugations or creases, extending in an inclined relationship to a longitudinal direction of the strip-shaped member.

6. Coupling joint according to claim 1, wherein a sealing material or compound is located between adjacently located wound turns of the intermediate member.

7. Coupling joint according to claim 1, wherein a sealing material or compound is applied to the inner and outer circumferential surfaces of the wound intermediate member.

8. Coupling joint according to claim 1, wherein the intermediate member includes resilient or elastic properties.

9. Coupling joint according to claim 1, wherein said intermediate member is helically wound as radially increasing diameter layers interposed between said first and second elements.

* * * * *